Nov. 9, 1948.  J. M. DOM  2,453,416
FLUID DISTRIBUTION SYSTEM
Filed Dec. 24, 1941
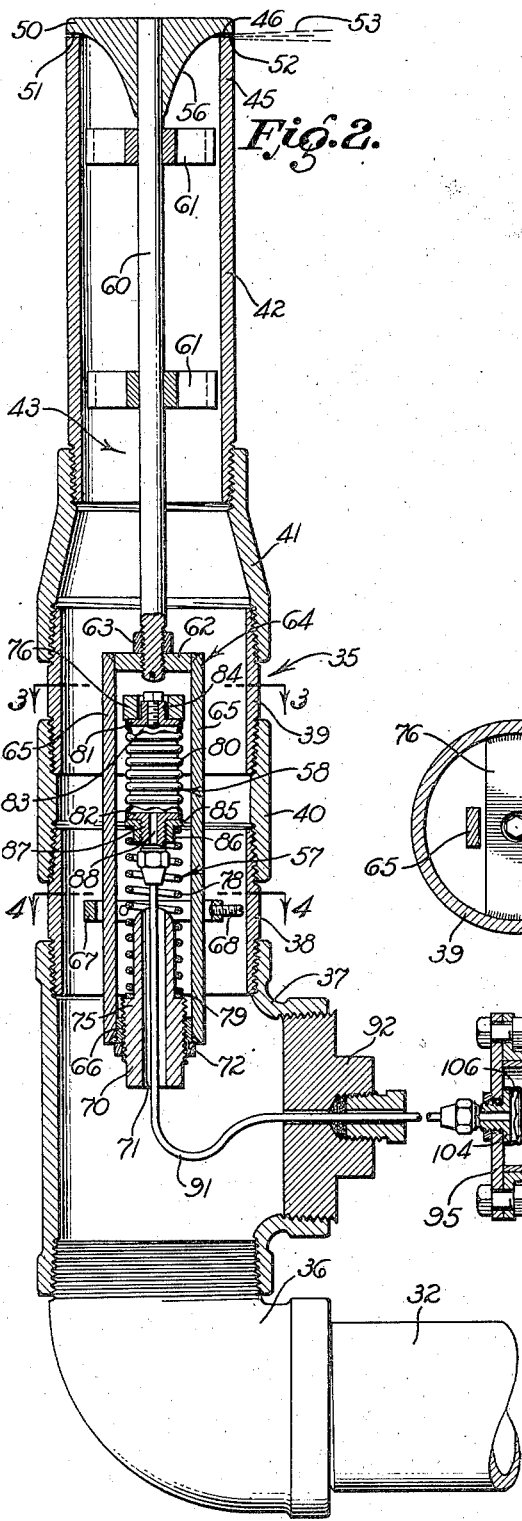
INVENTOR
JOHN M. DOM
HARRIS, KIECH, FOSTER & HARRIS
Clarence F. Kiech
FOR THE FIRM
ATTORNEYS Patented Nov. 9, 1948

2,453,416

UNITED STATES PATENT OFFICE 2,453,416

FLUID DISTRIBUTION SYSTEM

John M. Dom, Houston, Tex., assignor to Petrolite Corporation, Ltd., Wilmington, Del., a corporation of Delaware Application December 24, 1941, Serial No. 424,326

14 Claims. (Cl. 299—125)

My invention relates to a fluid distribution system and, more particularly, to a novel apparatus for adjustably delivering a stream of liquid to one or more tanks.

The invention finds particular utility in those arts in which it is desired to supply a stream of liquid to one or more tanks in carefully controlled manner, the control being determinative of one or more of such factors as the amount of liquid supplied, the velocity of discharge, the "throw" of the stream, the degree of agitation or mixing during discharge, the degree of circulation induced in the tank by the incoming stream, etc. It will be exemplified with reference to the delivery of a stream of liquid to a processing tank while controlling the stream to vary one or more of the factors noted above.

The liquids with which this invention is concerned may be of various composition, depending upon the particular process with which the invention is used. The liquid thus delivered to the processing tank may be homogeneous in the sense of being of uniform composition throughout and constituting a single-phase system. On the other hand, the invention is of particular utility in the distribution of composite or multiphase liquids constituting non-homogeneous systems. For example, the liquid may be a dispersion of emulsion of two relatively immiscible liquids or a suspension of solid particles in a liquid phase, or a suspension or dispersion comprising a liquid phase carrying both liquid and solid dispersoids. All such non-homogeneous systems are herein referred to as dispersions.

It is an object of the present invention to provide a novel flow distribution means by which the flow of liquid to one or more tanks can be very accurately controlled, this being especially important when it is desirable to maintain control of the input velocity independently of the input volume.

It is an object of the present invention to provide a novel mixing action including a controlled mixing or agitation step at the point of delivery to the processing tank and which can be accurately controlled by the operator.

It is an object of the present invention to provide for the accurate control of a mixing action to which a stream comprising a dispersion or a non-homogeneous liquid is subjected at the instant of delivery into a tank.

The invention, in its preferred embodiment, comprehends the formation of a usually substantially horizontal sheet-like stream discharging into the tank at a position within a body of liquid therein. The distance which this stream will "carry" in its movement toward a side wall of the tank will depend upon the velocity of discharge, which, in turn, will depend upon such factors as the pressure of the stream and the size of the orifice. It is an object of the present invention to provide a novel system for controlling or adjusting the "throw" of such a stream.

To obtain these and other desirable effects, it is desirable to use a distributor providing stationary and movable discharge members cooperating in defining an orifice through which the liquid discharges, the movable member being biased toward orifice-closing position by a suitable resilient means, such as a spring. It is an object of the present invention to provide a novel form of such distributor and to provide for adjustment of the biasing action in a novel manner.

In this connection, it is an object of the invention to provide serially-disposed resilient means and variable-volume means operatively connected to the discharge means. The serial connection is preferably such that the reaction force exerted by the resilient means is taken by the variable-volume means so that a change in volume can be made to change the biasing force exerted by the resilient means.

Another object of the invention lies in the use of a variable-volume means comprising a fluid-filled bellows disposed to be in temperature-transferring relationship with the liquid being discharged and, if desired, in pressure-transferring relationship therewith.

Another object of the invention is to provide for the control of the biasing force at a remote point, preferably at a position outside the tank, and to provide in this connection two variable-volume means, one being disposed to vary the biasing force and the other being operatively connected thereto in a manner to adjust the pressure, displacement, or fluid flow thereto or therefrom.

Further objects and advantages of the invention will be evident from the following description illustrative of one manner of using the invention.

Referring to the drawing:

Figure 1 is a diagrammatic view showing the applicability of the invention to a processing tank;

Figure 2 is a vertical sectional view of the fluid distribution system employed for such tank;

Figures 3 and 4 are cross-sectional views, taken along correspondingly indicated lines of Figure 2; and Figure 5 is a vertical sectional view of one form of adjustment means which can be employed.

By way of example, a dispersion of oil and water, formed by any suitable means, can be pumped under pressure into a pipe 23 for delivery to a processing tank 30 through a pipe 32 extending through a wall of the tank. Within the tank, the dispersion may be processed in any suitable manner, the oil and water being separated and discharged respectively through valved pipes 33 and 34.

The fluid distribution system for discharging the dispersion into the tank is best shown in Figure 2 and provides for the discharge of a horizontal stream of the dispersion. The preferred embodiment provides for radial delivery of the dispersion at a position coaxial with the vertical axis of the tank and at a vertical position which will be determined by the processing steps employed in the particular system. It is usually desirable that the stream be discharged into the tank in submerged position so as to flow radially outward in a liquid environment.

These results can be readily accomplished by the distribution system shown in Figures 1 and 2. Here, the pipe 32 communicates with a conduit means 35 including a street L 36, a T fitting 37, nipples 38 and 39 interconnected by a collar 40, a reducer 41, and a tube or conduit 42, these elements forming a part of a conduit means providing a passage 43 communicating with the interior of the pipe 32 and being preferably disposed as a riser pipe through which the dispersion moves upward in the tank to the desired discharge elevation.

The upper end of the tube or conduit 42 provides a stationary discharge member 45 providing an annular surface 46 extending substantially horizontally. The device also provides a movable discharge member 50 providing an annular surface 51. The discharge members 45 and 50 cooperate in defining a discharge orifice 52 through which a radially-flowing stream 53 discharges in a substantially horizontal direction, the desired degree of vertical flaring, if any, of this stream being determined by the design of the fluid distribution means.

The discharge members 45 and 50 are preferably biased toward closed-orifice position by a biasing means to be later described. Furthermore, it is desirable, in the preferred embodiment of the invention, that the movable discharge member 50 be movable under the action of the incoming stream in a direction opposite to the biasing force. This is accomplished in the illustrated embodiment by forming the movable discharge member 50 as a head extending across the upper end of the tube or conduit 42. Liquid forced upward will thus exert on the movable discharge member an upward force tending to open the orifice 52. This upward force will be exerted regardless of the configuration of the lower surface of the movable discharge member 50, but better control of the mixing action and a better centering action can be obtained by using a curved surface, such as indicated by the numeral 56, which spreads the stream toward the orifice 52.

The movable discharge member 50 is biased in a downward direction by use of a resilient means, indicated generally by the numeral 57, and a variable-volume means, indicated generally by the numeral 58, these means being connected serially to act between the stationary and movable discharge members 45 and 50. The operative connection with the movable discharge member 50 preferably comprises a pin 60 secured to and depending from the discharge member 50 and carrying spider-like guides 61 further aiding in the centering of the pin 60 and movable discharge member 50. The lower end of the pin 60 is threaded into a member 62 and locked with respect thereto, as by a nut 63. The member 62 forms a part of a cage 64 providing depending arms 65 secured at their lower ends to an internally-threaded sleeve 66. The cage 64 moves up and down with the movable discharge member 50 and may be centered with respect to the surrounding conduit means during its up and down motion by any suitable means, such, for example, as the means best shown in Figures 2 and 4. The centering means is shown as including a ring 67 welded to the outside corners of the depending arms 65, this ring carrying three radially-adjustable pins 68 of such length as to extend practically to the interior surface of the nipple 38 and serve as a centering means for the cage 64 and the lower end of the pin 60.

Adjustably connected to the cage 64, as by being threaded into the sleeve 66, is a member 70 providing an opening 71 and which can be advanced or retracted with respect to the cage 64 to form one adjustment means for the resilient means 57. Once adjusted to the desired position, this member is locked in place by any suitable means, such as a lock nut 72.

The invention provides a movable element 75 operatively connected to the movable discharge member 50 and shown as comprising a shoulder of the member 70. In addition, the invention provides a stationary element 76 shown as extending into the cage 64 and preferably comprising a bar welded at its ends to the nipple 39 to extend thereacross and between the depending arms 65 of the cage.

It is desired to dispose the resilient means 57 and the variable-volume means 58 serially between the movable and stationary element 75 and 76 in such manner as to bias the movable discharge member 50 toward closed-orifice position. The preferred arrangement is such that the resilient means exerts a downward force on the movable discharge member 50, the upward reaction force being taken by the variable-volume means 58. Correspondingly, an adjustment of the variable-volume means can serve to adjust the resilient force exerted on the movable discharge member 50, as well as the throttling and mixing action of the orifice 52.

The preferred construction, shown in Figure 2, utilizes a compression spring 78 as the resilient means. The lower or first end of this spring is disposed in pressure-transferring relationship with the movable element 75, as by bearing thereagainst. To permit relative motion between the lower end of the spring and the member 70 during adjustment of the latter, a washer 79 may be provided therebetween. It will be understood that various resilient means other than a spring can be employed and that, by suitable design, the forces therein can be in tension rather than compression, without departing from the spirit of the invention, it being the function of this resilient means 57 to exert resilient force on the movable discharge member 50 under the control of the variable-volume means 58.

The variable-volume means 58 may take any one of a number of different forms but the preferred embodiment utilizes a fluid-filled bellows 80 in this connection, the upper or first end of the bellows being closed by a wall 81 and the lower or second end of the bellows being closed by a wall 82, these walls and the intervening bellows providing fluid-filled chamber 83. The walls 81 and 82 are movable toward and away from each other in response to changes in the amount or pressure of the fluid in the chamber 83 or in response to expansion or contraction of the fluid under the influence of changes in temperature or pressure of the liquid moving through the conduit means 35, which liquid, in the preferred embodiment, moves in heat-transferring and pressure-transferring relationship with the bellows 80 and, correspondingly, with the fluid therewithin.

The upper or first end of the bellows 80 is disposed in pressure-transferring relationship with the stationary member 76, as by bearing thereagainst. As shown, the stationary member 76 provides an opening receiving a head 84 formed integrally with the upper wall 81 to prevent displacement of the upper end of the bellows from the stationary member 76.

To obtain the serial connection of the bellows 80 and spring 78 between the movable and stationary members 75 and 76, I prefer to provide a freely movable means transferring pressure between the lower or second end of the bellows 80 and the upper or second end of the spring 78. This function is performed by an abutment member 85 providing an internally-threaded collar 86 which extends into the upper end of the spring 78 in centering relationship, and which threadedly receives an extension 87 of the lower wall 82, there being a passage 88 through this extension and wall through which fluid may be delivered to or withdrawn from the chamber 83. The positions of the variable-volume means 58 and the resilient means 57 can be transposed without departing from the spirit of the invention, it being only necessary that one end of the variable-volume means should be in pressure-transferring relationship with one of the elements 75 or 76 and that one end of the resilient means should be in pressure-transferring relationship with the other of these elements, the intervening ends of the variable-volume means and resilient means being in pressure-transferring relationship with each other.

In the preferred embodiment of the invention, means is provided for moving fluid into or from the chamber 83 to adjust the biasing action of the spring 78. The preferred method of accomplishing this is shown in Figure 5 as comprising a second variable-volume means 90 which is filled with fluid and interconnected with the chamber 83 through a small pipe 91. This pipe extends through a cap 92 threaded into the T 37 and extends upward through the passage 71 in spaced relation with the walls thereof, being suitably connected in pressure-tight relationship with the passage 88. As the chamber 83 expands and contracts to change the compression of the spring 78, there is a slight movement between the pipe 91 and the cage 64 or between this pipe and any stationary portion of the equipment. Correspondingly, the pipe 91 is spaced from all portions of the cage 64 and is preferably bent at its lowermost portion, as shown, or provided with a suitable expansion coil, so that sharp bending stresses at any particular section are avoided.

The second variable-volume means 90 is shown as comprising a fluid-filled bellows 93 disposed in a sleeve 94 closed by a base plate 95. The other end of the sleeve 94 provides a yoke 96 carrying a sleeve 97 internally threaded to receive an adjustment member 98. A stationary yoke 99 provides an opening 100 through which the adjustment member 98 extends, there being locked nuts 101 and 102 on opposite sides of the yoke to permit free rotation of the adjustment member relative to the stationary yoke while moving same toward or away from the base plate 95. The bellows 93 is compressed between the base plate 95 and the stationary yoke 99. This bellows provides end walls 104 and 105, similar to the walls 81 and 82 previously described, whereby there is formed in the bellows 93 a chamber 106 containing any suitable fluid. While compressible fluids can be employed, the preferred fluid is a relatively incompressible liquid, such as water or oil, so that a small contraction of the bellows 93 will effect a proportional expansion of the bellows 80. In addition, if liquid is used in the control system, it is desirable that this liquid should be of such character as not to vaporize or release vapors when subjected to the steady or fluctuating temperatures of the stream moving through the passage 43 of the conduit means 35. This can be accomplished by using a liquid having a sufficiently high boiling point to preclude vapor liberation at the temperatures and pressures employed. In this connection, the pressure in such a liquid-filled control system will usually be considerably higher than the pressure inside the tank due to the pressure required to compress the spring 78, and it is desirable to design the invention so that the pressure in such a fluid-filled control system will be sufficient to prevent vapor liberation at the constant or fluctuating temperatures of the stream rising through the conduit means 35.

It is preferable to be able to adjust the system from a position outside the tank. This can be accomplished by positioning the bellows 93 and its related structure inside the tank and extending the adjustment member 98 to a position exterior thereof. Figure 5 indicates one side wall of the tank by the numeral 106' and shows a collar 107 welded thereto and into which the yoke 96 is threaded. Also threaded into this collar is a nipple 108 providing a packing gland structure 109 for preventing any leakage of liquid to the exterior of the tank. The adjustment member 98 is provided with a hand wheel or other means 110 to facilitate rotation thereof.

It will be clear that, as the hand wheel 110 is turned in a direction to decrease the volume of the bellows 93, fluid will be forced through the pipe 91 into the bellows 80 in expanding relation. This expansion will increase the biasing force exerted on the movable discharge member 50 by the spring 78. Conversely, if the biasing force is to be reduced, the adjustment member 98 is turned in an opposite direction to increase the volume of the bellows 93 and effect a reverse flow of fluid thereinto from the bellows 80. An important feature of the invention is that the hydraulic adjustment of the biasing force permits either major or minor adjustments with extreme accuracy, without lost motion such as would be present in a mechanical remote control, and without the necessity of entering the tank and changing the adjustment of the member 70, which would be necessary in the absence of the remote control. Minor adjustments may be made to adjust the volume discharged, the velocity, the "carry" of the stream, the mixing at the point of discharge, the pressure drop across the distributor, etc. Major adjustments include larger changes in these respects or the release of the biasing force to flush the distributor and remove solid material which may have accumulated therewithin to interfere with the desired equal circumferential discharge.

It should be noted, also, that a variable-volume means, such as the bellows 80, can serve, in itself, to adjust the biasing force upon change in temperature or pressure of the liquid flowing through the conduit means 35. An increase in temperature of the liquid will tend to expand the fluid in the bellows 80. This may be particularly desirable on those liquids which change viscosity markedly with change in temperature, and aids in controlling the mixing action during discharge from the orifice 52 in response to changes in viscosity. Likewise, an increase in pressure on the conduit means 35 may provide minor adjustments in the biasing force due to compression of the fluid in the bellows 80, though this action is ordinarily very small unless a compressible fluid is employed. If the bellows 93 is disposed inside the tank, it also will be influenced by an increase in temperature or pressure of the liquid and can be made to influence the biasing force. If the base plate 95 is made integral with the side wall of the tank, the bellows 93 can be made responsive to conditions of temperature and pressure outside the tank to modify the change in biasing force as influenced by changes in pressure and temperature acting on the bellows 80.

Various changes and modifications can be made without departing from the spirit of the invention as defined in the appended claims.

I claim as my invention:

1. In a fluid distribution system for discharging a liquid stream, the combination of: conduit means for conducting a liquid stream, said conduit means including a stationary discharge member; a movable discharge member cooperating with said stationary discharge member in providing a discharge orifice which varies in size as said movable discharge member is moved; a stationary element attached to said conduit means and positioned therein; a movable cage in said conduit means and into which said stationary element extends, said cage providing a movable element which moves with said cage; means for attaching said cage to said movable discharge member to move therewith; a spring in said cage and providing one end bearing against said one of said elements; a fluid-filled bellows in said cage and providing one end bearing against the other of said elements; and means for connecting the other ends of said spring and bellows in pressure-transferring relationship to dispose said spring and bellows serially between said elements in such manner that the reaction force of said spring is transmitted to said bellows and thence to said other of said elements.

2. In a fluid distribution system for discharging a liquid stream, the combination of: conduit means for conducting a liquid stream, said conduit means including a stationary discharge member; a movable discharge member cooperating with said stationary discharge member in providing a discharge orifice which varies in size as said movable discharge member is moved; a stationary element attached to said conduit means and positioned therein; a movable cage in said conduit means and into which said stationary element extends, means adjustably connected to said cage and providing a movable element normally moving with said cage but adjustable with respect thereto; means for attaching said cage to said movable discharge member to move therewith; a spring in said cage and providing one end bearing against one of said elements; a fluid-filled bellows in said cage and providing one end bearing against the other of said elements; and means for connecting the other ends of said spring and bellows in pressure-transferring relationship to dispose said spring and bellows serially between said elements in such manner that the reaction force of said spring is transmitted to said bellows and thence to said other of said elements.

3. A combination as defined in claim 2, in which said means adjustably connected to said cage provides an opening, and including pipe means extending through said opening and communicating with the interior of said bellows.

4. In a fluid distribution system for discharging a liquid stream at a discharge position and exerting a mixing action thereon at the instant of discharge, the combination of: conduit means for conducting a stream of liquid to said discharge position, said conduit means including a stationary discharge member providing a passage through which said liquid is moved preparatory to discharge; a movable discharge member extending across said passage in the path of said liquid and cooperating with said stationary discharge member in defining an orifice through which said stream is discharged at said discharge position; a movable element fixedly connected to said movable discharge member to move therewith; a stationary element; a resilient means providing first and second ends, said first end being disposed in pressure-transferring relationship with one of said elements; a fluid-filled variable-volume means including first and second walls movable toward and away from each other in response to changes in the amount of fluid in said variable-volume means, said first wall being disposed in pressure-transferring relationship with the other of said elements; means for connecting said second wall and said second end of said resilient means in pressure-transferring relationship whereby said variable-volume means and said resilient means are connected serially between said elements, said serial connection being such as to bias said movable discharge member toward orifice-closing position; and means for adjusting the intensity of said mixing action by changing the degree of said bias, said means including pipe means communicating with said variable-volume means and means for moving fluid into and from said variable-volume means through said pipe means.

5. A combination as defined in claim 4, in which said means for moving fluid includes a second variable-volume means containing said fluid and means for varying the volume of said second variable-volume means to displace fluid therefrom to said variable-volume means associated with said resilient means.

6. A combination as defined in claim 4, in which said means for moving fluid includes a second variable-volume means containing said fluid and remote from said variable-volume means associated with said resilient means, and means for varying the volume of said second variable-volume means to displace fluid therefrom to said variable-volume means associated with said resilient means, said means for varying said volume including an adjustment member remote from said variable-volume means associated with said resilient means.

7. In a fluid distribution system for discharging a liquid stream, the combination of: a conduit means adapted to receive a stream of said liquid and providing an open end to which said stream of said liquid is delivered; a head member extending across said open end and cooperating therewith in providing an orifice; means for mounting said head member to move toward open-orifice position by pressure exerted thereon by said liquid stream in said conduit means; means for resiliently biasing said head member toward closed- orifice position, this means including a stationary element, a movable element secured to said head member, and a resilient means and a fluid-filled bellows disposed operatively between said elements to move said head member resiently toward closed-orifice position in opposition to the force exerted on said head member by said liquid stream, said resilient means and said bellows being disposed to act serially between said elements in such manner that the reaction of the force exerted on said head member by said resilient means is transmitted to said bellows and thence to one of said elements; and control means for adjusting the resilient force exerted by said resilient means on said head member, said control means including a pipe communicating with the interior of said fluid-filled bellows and means for advancing fluid along said pipe to control the pressure in said bellows.

8. A combination as defined in claim 7, in which said fluid-filled bellows is disposed in said conduit means to be protected thereby and to be in contact with the liquid stream moving therethrough.

9. In a fluid distribution system for discharging a stream of a dispersion while mixing same in controlled degree at the position of discharge, the combination of: a conduit for conducting a stream of said dispersion to said discharge position; discharge means at said discharge position communicating with said conduit and providing movable and stationary discharge members cooperating in providing an orifice of variable area for discharging said stream while mixing said dispersion at the instant of discharge due to turbulence produced by flow through said orifice; a stationary element; a movable element secured to said movable discharge member; means for exerting a biasing force on said movable discharge member tending to move same toward an orifice-closing position, said means including a resilient means in pressure-transferring relation with one of said elements and a deformable fluid-filled bellows providing two ends, one end being disposed in pressure-transferring relation with the other of said elements and the other of said ends being in pressure-transferring relation with said resilient means, whereby the extent of the biasing action of said resilient means and the extent of the mixing action of said orifice is under the control of said bellows upon expansion and contraction thereof; and control means for adjusting the biasing force exerted by said resilient means on said movable discharge member, said control means including a pipe communicating with the interior of said fluid-filled bellows and means for changing the pressure in said pipe to change the pressure in said bellows and thus determine the size thereof.

10. In a fluid distribution system for discharging a liquid stream and mixing same at the instant of discharge, the combination of: conduit means for conducting the liquid stream to a discharge position, said conduit means including a stationary discharge member at said discharge position; a movable discharge member at said discharge position in the path of movement of said liquid stream along said conduit means and cooperating with said stationary discharge member in providing a discharge orifice at said discharge position, said liquid stream exerting a force on said movable discharge member tending to increase the size of said discharge orifice and thus tending to change the mixing action on said liquid stream at said discharge position; a stationary element attached to said conduit means and positioned therein; a movable element in said conduit means and attached to said movable discharge member to move therewith; a fluid-filled bellows in said conduit means and surrounded by the liquid stream advancing in said conduit means toward said discharge orifice, said fluid-filled bellows bearing against one of said elements; and a compression spring in said conduit means and providing a first end bearing against the other of said elements and a second end bearing against said bellows to exert a reaction force against said bellows upon movement of said discharge member.

11. In a fluid distribution system for discharging a stream of a dispersion and exerting thereon a controlled mixing action at the instant of discharge, the combination of: conduit means for conducting a stream of the dispersion to a discharge position, said conduit means including a stationary discharge member at said discharge position; a movable discharge member at said discharge position in the path of said stream of dispersion moving along said conduit means and cooperating wtih said stationary discharge member in providing a discharge orifice at said discharge position, said stream of dispersion exerting on said movable discharge member a force tending to increase the size of said discharge orifice to vary the mixing action on said dispersion at said discharge position; a stationary element attached to said conduit means and positioned therein; a movable element in said conduit means and attached to said movable discharge member to move therewith; a fluid-filled bellows in said conduit means and surrounded by the stream of dispersion advancing in said conduit means toward said discharge position, said fluid-filled bellows bearing against one of said elements; a spring in said conduit means and providing a first end bearing against the other of said elements and a second end bearing against said bellows; and means for varying the mixing action of said discharge orifice on said dispersion and including means for forcing fluid into said bellows under sufficient pressure to expand said bellows against said spring to compress said spring and thus exert a resilient force on said movable element acting to move said movable discharge means resiliently toward orifice-closing position.

12. In a device for discharging a dispersion of two liquids and mixing same in controlled amount at the instant of discharge, the combination of: a valve means comprising movable and stationary discharge members cooperating in defining a variable-size orifice; a conduit means for delivering a dispersion of said two liquids under pressure to said valve means to be discharged through said orifice and mixed in a degree determined by the size of said orifice, said movable discharge member being in the path of flow of said dispersion to be acted upon by the pressure of the stream of dispersion in a manner tending to move same away from said stationary discharge member and thus tending to increase the size of said orifice; resilient means operatively connected to said movable discharge member to exert thereon a resilient force opposing the tendency thereof to be moved by said stream of dispersion; and means operable from a control position remote from said discharge position for adjusting the resilient force exerted by said resilient means on said movable discharge member, said means including a first hydraulic means for controlling the resilient force exerted on said movable discharge member by said resilient means and a second hydraulic means operable from said control position for controlling the action of said first hydraulic means.

13. In a system for discharging a dispersion of two liquids and mixing same in controlled amount at the point of discharge, the combination of: means for discharging said dispersion as a substantially flat substantially horizontal sheet radiating from a discharge position, said means including a riser pipe including a stationary discharge member providing an annular substantially horizontal surface at said discharge position, said riser pipe and stationary discharge member providing a passage terminating at said discharge member for conducting a stream of said dispersion to said discharge position, and a movable discharge member traversing said passage to spread said stream and providing an annular substantially horizontal surface cooperating with said annular surface of said stationary discharge member in providing an annular orifice through which the spread stream discharges radially as a substantially flat sheet and in which orifice the dispersion is mixed by turbulence at the instant of discharge, said stream exerting on said movable discharge member a force tending to move same toward open-orifice position; and means for varying the mixing action on said stream by varying the size of said orifice, said means including a resilient means exerting on said stationary discharge member a resilient biasing force tending to move same toward closed-orifice position, and hydraulic means for adjusting said resilient biasing force and thus varying the mixing action on said stream in said annular orifice.

14. In a system for discharging a dispersion of two liquids and mixing same in controlled amount at the instant of discharge, the combination of: conduit means for conducting a stream of the two-liquid dispersion to a discharge position, said conduit means including a stationary discharge member at said discharge position; a movable discharge member at said discharge position in the path of movement of said stream along said conduit means and cooperating with said stationary discharge member in providing a discharge orifice, said liquid stream exerting a force on said movable discharge member tending to increase the size of said discharge orifice and thus tending to change the mixing action on said two-liquid stream at said discharge position; a stationary element; a movable element secured to said movable discharge member; and means for exerting an adjustable biasing force on said movable discharge member tending to move same toward an orifice-closing position, said means including a variable-volume means having two spaced portions, means for operatively connecting one of said portions to one of said elements, means for operatively connecting the other of said portions to the other of said elements, a fluid-supply pipe communicating with said variable-volume means and control means remote from said variable-volume means for controlling the delivery of fluid to said variable-volume means through said fluid-supply pipe and thus controlling said biasing force to control the mixing action exerted on said two-liquid stream during passage through said orifice.

JOHN M. DOM.

REFERENCES CITED

The following references are of record in the file of this patent:

UNITED STATES PATENTS

| Number | Name | Date |
|---|---|---|
| 406,625 | Burk | July 9, 1889 |
| 1,112,416 | Sargent | Sept. 29, 1914 |
| 1,143,293 | Luehrs | June 15, 1915 |
| 1,232,269 | Forbes | July 3, 1917 |
| 1,363,470 | Knudsen | Dec. 28, 1920 |
| 1,438,502 | Peebles | Dec. 12, 1922 |
| 1,452,265 | Collins et al. | Apr. 17, 1923 |
| 1,628,823 | Chester et al. | May 17, 1927 |
| 1,764,825 | Browne | June 17, 1930 |
| 1,813,122 | Moore | July 7, 1931 |
| 1,960,802 | Backstrom et al. | May 29, 1934 |
| 1,996,159 | Kittredge | Apr. 2, 1935 |
| 2,033,167 | Worthington | Mar. 10, 1936 |
| 2,063,480 | Braem | Dec. 8, 1936 |
| 2,082,883 | Geisler et al. | June 8, 1937 |

FOREIGN PATENTS

| Number | Country | Date |
|---|---|---|
| 453,918 | Great Britain | Sept. 16, 1936 |
| 683,901 | Germany | Nov. 18, 1939 |

Certificate of Correction

Patent No. 2,453,416. November 9, 1948.

JOHN M. DOM

It is hereby certified that errors appear in the printed specification of the above numbered patent requiring correction as follows:

Column 1, line 29, for "of emulsion" read *or emulsion*; column 9, line 17, for "resiently" read *resiliently*; column 11, line 44, for "froce" read *force*;

and that the said Letters Patent should be read with these corrections therein that the same may conform to the record of the case in the Patent Office.

Signed and sealed this 15th day of March, A. D. 1949.

[SEAL]

THOMAS F. MURPHY,
*Assistant Commissioner of Patents.*